(12) United States Patent
Suzuki

(10) Patent No.: US 6,774,933 B1
(45) Date of Patent: Aug. 10, 2004

(54) ELECTRONIC CAMERA WITH CAPTURED IMAGE PRINT FUNCTION

(75) Inventor: Takeshi Suzuki, Akiruno (JP)

(73) Assignee: Olympus Corporation, Tokyo (JP)

(*) Notice: Subject to any disclaimer, the term of this patent is extended or adjusted under 35 U.S.C. 154(b) by 0 days.

(21) Appl. No.: 09/500,096

(22) Filed: Feb. 8, 2000

(30) Foreign Application Priority Data

Feb. 8, 1999 (JP) ............................................. 11-029818

(51) Int. Cl.[7] ............................................ H04N 5/225
(52) U.S. Cl. ...................... 348/207.2; 348/375; 348/372
(58) Field of Search .......................... 348/207.99, 207.2, 348/372, 373, 374, 375, 376; 396/429, 30, 376, 423; H04N 5/225

(56) References Cited

U.S. PATENT DOCUMENTS

| | | | | |
|---|---|---|---|---|
| 4,717,961 A | * | 1/1988 | Miyake et al. ............ | 348/231.9 |
| 5,847,836 A | * | 12/1998 | Suzuki ....................... | 358/296 |
| 5,999,203 A | * | 12/1999 | Cane et al. ................. | 347/171 |
| 6,040,849 A | * | 3/2000 | McIntyre et al. ........... | 347/214 |
| 6,091,909 A | * | 7/2000 | McIntyre et al. ........... | 396/278 |
| 6,104,886 A | * | 8/2000 | Suzuki et al. ............... | 396/429 |
| 6,559,963 B1 | * | 5/2003 | Kamimura .................. | 358/1.15 |
| 6,577,338 B1 | * | 6/2003 | Tanaka et al. ........... | 348/207.2 |
| 6,580,460 B1 | * | 6/2003 | Takahashi et al. .......... | 348/372 |

FOREIGN PATENT DOCUMENTS

| | | | | |
|---|---|---|---|---|
| JP | 9-26561 | | 1/1997 | |
| JP | 10143290 A | * | 5/1998 | ............. G06F/1/26 |
| JP | 10200800 A | * | 7/1998 | ......... H04N/5/225 |
| JP | 11025941 A | * | 1/1999 | ............ H01M/2/10 |
| JP | 11088814 A | * | 3/1999 | ......... H04N/5/765 |
| JP | 11298832 A | * | 10/1999 | ............ H04N/5/76 |

* cited by examiner

Primary Examiner—Wendy R. Garber
Assistant Examiner—Justin Misleh
(74) Attorney, Agent, or Firm—Straub & Pokotylo; John C. Pokotylo

(57) ABSTRACT

An electronic camera includes an electronic imaging section which performs photoelectric conversion of the subject image and generates an electrical image information, a printer to print an image of the image information obtained by the electronic imaging section on a printing paper, and a taking picture controller to control taking picture by the electronic imaging section, and when a print operation by the printer is performed, the taking picture controller prohibits a taking picture operation.

9 Claims, 5 Drawing Sheets

L = LOCK
R = RELEASE

ELECTRONIC CAMERA WITH CAPTURED IMAGE PRINT FUNCTION

CROSS-REFERENCE TO RELATED APPLICATION

This application is based upon and claims the benefit of priority from the prior Japanese Patent Application No. 11-029818, filed Feb. 8, 1999, the entire contents of which are incorporated herein by reference.

BACKGROUND OF THE INVENTION

The present invention relates to an electronic camera to obtain electric image data by imaging a subject image, and especially, to an electronic camera which comprises a print mechanism.

Recently, an electronic camera (digital still camera) able to image a subject image by the CCD imaging element etc., and to memorize the obtained image data to record mediums such as compact flash (CF) and Smart Media (SSFDC) has been put to practical use. It is expected that the use of such electronic cameras will spread more and more in the future because of their small size, lightness, and in addition, the ability to rewrite image data.

By the way, a so-called instant camera, which prints a picture image at the same time as the picture is taken (instant photograph by diffusion transfer method, and Polaroid method, etc.), has been put to practical use. In an electronic camera, a camera which enables the printout immediately after taking a picture is variously proposed by providing the print mechanism in the camera itself.

However, an electronic camera which comprises the print mechanism has the following disadvantages. A big current is required for the print operation and the picture taking operation. When the picture taking operation is performed during printing, the peak value of the power dissipation becomes large. When the peak value of the power dissipation becomes large, a usable period of the camera battery becomes short. In addition, since the small size is one of the desirable features of an electronic camera, and there is a limitation in the built-in battery size, it is preferable to avoid enlarging the peak value of the power dissipation.

Moreover, when the power dissipation exceeds the power peak value of the battery during printing, an irregular print may occur, the print may be interrupted, and, in the worst case, the print may fail. Especially, when the print mechanism is accompanied by the chemical treatment such as the diffusion transfer method and Polaroid method, the sheet becomes useless when the print processing is interrupted.

BRIEF SUMMARY OF THE INVENTION

An object of the present invention is to provide an electronic camera which can extend battery life by buffering peak power dissipation, and can prevent print failures in an electronic camera which comprises print mechanism to print out a picture image taken.

To solve the above-mentioned problem, the present invention adopts the following configurations.

A first electronic camera according to the present invention is characterized by comprising: an electronic imaging section which performs photoelectric conversion of the subject image and generates an electrical image information; a printer to print an image of the image information obtained by the electronic imaging section on a printing paper; and a picture taking controller to control picture taking by the electronic imaging section, such that when a print operation by the printer is performed, the picture taking controller prohibits a picture taking operation.

According to the first electronic camera of the present invention, since the picture taking operation is prohibited when the print is performed, print operation requiring large power dissipation and the picture taking operation are not simultaneously performed. Therefore, since the peak value of the power dissipation can be suppressed, lengthening the usable period of the battery becomes possible. Since the print operation and the picture taking operation are not simultaneously performed, it becomes possible to avoid exceeding the power peak value of the battery during printing, and to prevent the occurrence of an irregular print and print interruption. This is especially valid for the print method in which the print fails when the print processing is interrupted like the diffusion transfer method.

A second electronic camera according to the present invention is characterized by comprising: an electronic imaging section which performs photoelectric conversion of the subject image and generates an electrical image information; a printer to print an image of the image information obtained by the electronic imaging section on a printing paper; a flash luminescence section to irradiate a flash luminescence light to a subject; and a flash controller to control a charge to a flash capacitor for a flash luminescence by the flash luminescence section, such that when a print operation by the printer is performed, the flash controller prohibits a charge operation to the flash capacitor.

According to the second electronic camera of the present invention, since the flash charge operation is prohibited when the print is performed, the print operation requiring large power dissipation and the flash charge operation are not simultaneously performed. With this configuration, it is possible to suppress the peak value of the power dissipation, to lengthen the usable period of the battery, and to prevent the occurrence of an irregular print and print interruption.

A third electronic camera according to the present invention is characterized by comprising: an electronic imaging section which performs photoelectric conversion of the subject image and generates an electrical image information; a printer to print an image of the image information obtained by the electronic imaging section on a printing paper; a lock section having a locked state for locking a battery cover and/or a DC plug into a DC lack: and a controller to place the locking section in the locked state when a print operation by the printer is performed.

According to the present invention, since the power supply and the power supply plug are prohibited from being removed from the main body of the camera when the print is performed, print interruption can be prevented.

A fourth electronic camera, which is driven by a battery, according to the present invention is characterized by comprising: an imaging section which converts a subject image into image data; a print section which prints the converted image data in a predetermined print form; and a sequence controller which prohibits an operation of at least one of the imaging section and a flash charge section, when the print section is operated. In this case, it is desirable that the print section include a print mechanism which uses a photosensitive paper and performs a chemical treatment, and that the print section further include a print mechanism which outputs a positive image. According to the fourth electronic camera, advantages according to first and second electronic cameras and an advantage according to the third electronic camera can be achieved.

The present invention may include one or more of the following features.

(1) In the third and fourth electronic cameras, the lock means couples a part of a lock plate with a part of the battery cover and prevents the battery cover from being opened and shut.

(2) In the third and fourth electronic cameras, the lock means inserts a projection into a trench provided in a DC plug and prevents the DC plug from being removed from the camera.

(3) In the first to third electronic cameras, the printer has a luminescence section to expose a photosensitive sheet based on the image information obtained by the electronic imaging section, and a transportation section to transport the photosensitive sheet.

(4) When the printer is performing printing, at least two controls of the operation controls of above-mentioned picture taking prohibition control, charge prohibition control, and lock section are performed at the same time.

According to the present invention, in the configuration which comprises the print mechanism to print out the image after taking a picture, since the picture taking operation, the flash charge operation, and the power supply ejection operation, etc. are prohibited during printing, the usable period of the battery can be extended by buffering the peak value of the power dissipation, and print failure can be prevented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
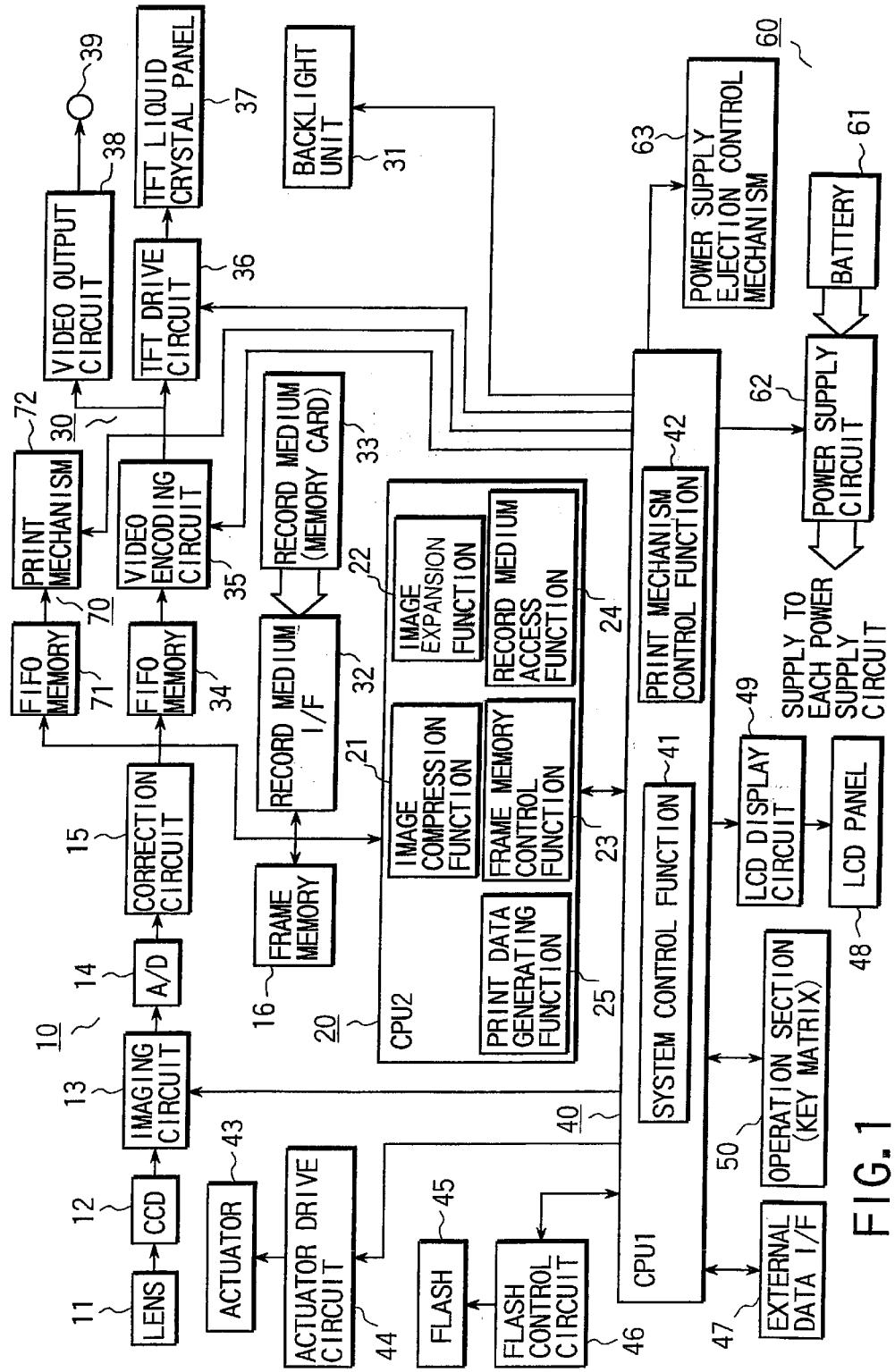
FIG. 1 is a block diagram which shows basic configuration of electronic camera which comprises print mechanism.

Hereafter, details of the present invention will be explained with the embodiment referring to the drawings.

First Embodiment

FIG. 1 is a block diagram which shows a configuration of electronic camera having a print function according to the first embodiment of the present invention.

An electronic camera according to the first embodiment has imaging section 10, image data processing section 20, image data record and display section 30, control section 40, operation section 50, power supply section 60, and print section 70.

Imaging section 10 has imaging lens 11, CCD imaging element 12, imaging circuit 13, A/D converter 14, correction circuit 15 which performs white balance, and the gamma correction, etc., and frame memory 16, etc. Imaging section 10 images the subject image taken through the optical system, which includes imaging lens 11, on CCD imaging element 12, and converts the imaged image data into a digital signal with A/D converter 14. Imaging section 10 performs the white balance and the gamma correction, etc. with correction circuit 15, and thereafter stores images in frame memory 16 one by one.

Image data processing section 20 has CPU 2 which comprises image compression function section 21, image expansion function section 22, frame memory control function section 23, record medium access function section 24, and print data generating function section 25. Image data processing section 20 has the following functions. Image data processing section 20 stores the plurality of image data stored in said frame memory 16 to a record buffer not shown in the figure) by compressing the image one by one, expands the image data stored in this record buffer, and sends to FIFO memory 34 of image data record and display section 30. In addition, image data processing section 20 accesses record medium 33 of image data record and display section 30.

Image data record and display section 30 has backlight 31, record medium I/F 32, record medium 33 such as the flash memory card, display FIFO memory 34, video encode circuit 35, TFT drive circuit 36, TFT liquid crystal panel 37, video output circuit 38, and video output terminal 39. Image data record and display section 30 has the following functions. Image data record and display section 30 reads the image data recorded in the record buffer and records in record medium 33. Image data record and display section 30 reads the image data recorded in record medium 33, sends to the display system, and displays the image.

The image data sent to the display system is temporarily stored in display FIFO memory 34. The image data read from display FIFO memory 34 is converted into a video signal with video encode circuit 35 and the character etc. are added thereto. Then, on one hand, a video signal to which this character etc. are added is supplied to TFT liquid crystal panel 37 through TFT drive circuit 36, and displayed as a subject image. On the other hand, it is output from a video output terminal 39 to the outside as an image signal through video output circuit 38.

Control section 40 is mainly constructed by CPU 1 which comprises system control function section 41, print mechanism control function section 42, and various other function sections (for example, compression rate change function section and pixel number change function section, etc.). Control section 40 totally controls the entire systems of imaging section 10, image data processing section 20, and image data record and display section 30, etc.

Actuator driver drive circuit 44 to drive actuator 43 which includes zooming motor or AF motor, etc., flash control circuit 46 to control luminescence of flash 45, external data I/F 47 to exchange data with personal computer etc., and LCD display circuit 49 to display various information on LCD panel 48 are attached to control section 40.

Operation section 50 is connected with above-mentioned control section 40, and has the keyboard matrix which performs the switch input for the camera operation as a main operation section. Operation section 50 performs necessary control operation by giving the operation signal from the outside to above-mentioned control section 40.

Power supply section 60 uses battery 61 (for example, 1.5V×4 pieces) as main power supply and supplies the power supply of a predetermined voltage to each circuit through power supply circuit 62. Battery 61 and power supply eject control mechanism section 63 to control the release of the DC plug are provided to power supply section 60.

Figure 2:
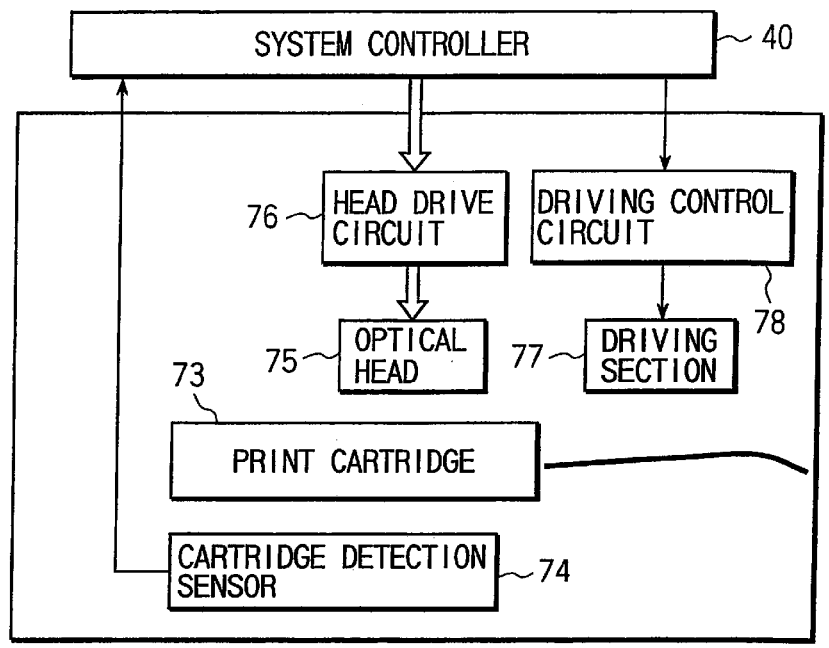
FIG. 2 is a block diagram which shows specific configuration of print mechanism.

Print section 70 is constructed by FIFO memory 71 to memorize the print data temporarily and the print mechanism 72. Print mechanism 72 comprises print cartridge 73 which stores the sheets, cartridge detection sensor 74, line optical head 75, head drive circuit 76 to emit and drive optical head 75 electrically, driving section 77 which moves the form, and driver control circuit 78 to control driving section 77, as shown in FIG. 2.

Though the diffusion transfer method, the ink-jet type, and the sublime type may be acceptable for the print method in print section 70, an instant camera method to obtain the positive image directly by using the diffusion transfer method will be explained in this embodiment. In this case, a two dimensional image can be printed out by reading the image data for every one or more lines, driving optical head 75, and moving the sheet.

Next, the operation of this embodiment will be explained referring to the flow charts of FIG. 3 and FIG. 4.

Figure 3:
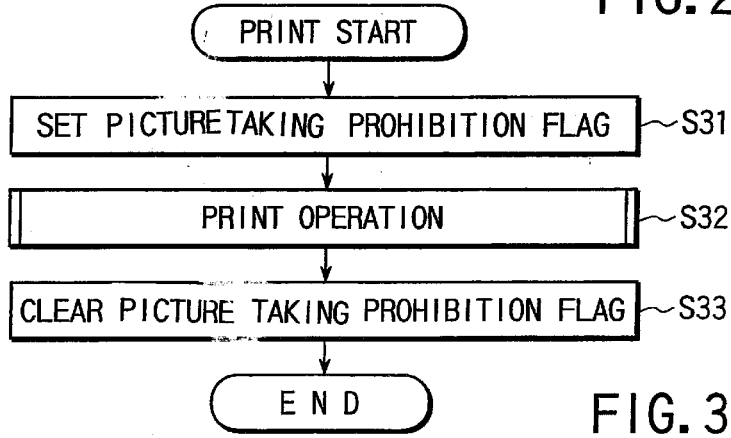
FIG. 3 is a flow chart which shows a print mode processing in the first embodiment.

When the start of print is directed by the user as shown in FIG. 3, the picture taking prohibition flag is set first (step S31). Thereafter, the print operation is performed (step S32). Then, when the print operation ends, the picture taking prohibition flag is cleared (step S33).

Figure 4:
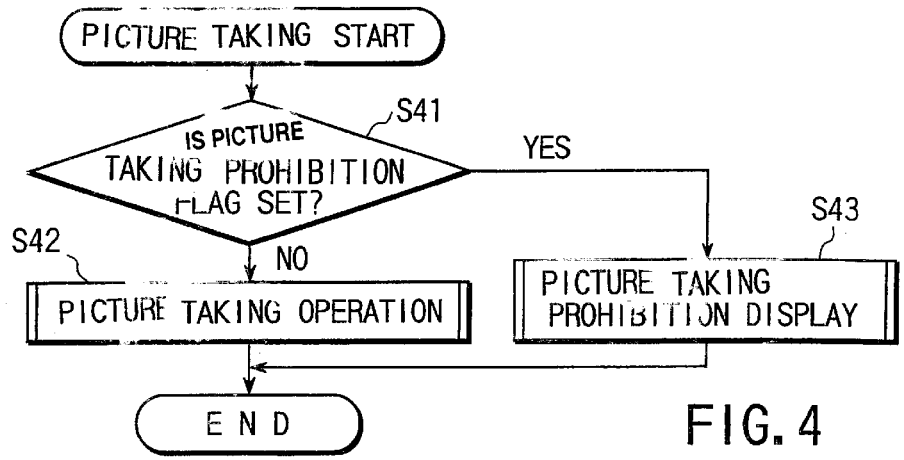
FIG. 4 is a flow chart which shows picture taking mode processing in the first embodiment.

It is judged whether the picture taking prohibition flag is set first, when the start of the picture taking is directed by the user as shown in FIG. 4 (step S41). Then, if the taking picture prohibition flag is not set, the picture taking operation is performed (step S42). However, if the picture taking prohibition flag is set, the picture taking prohibition is displayed, and the picture taking operation cannot be performed (step S43).

Even if the start of the picture taking is directed during printing, the picture taking operation cannot be performed, as shown in the flow chart of FIG. 3, since the picture taking prohibition flag is set during printing. That is, the picture taking operation can be prevented from being performed during printing.

As described above, according to this embodiment, since the picture taking prohibition flag is set at the start of print, and the picture taking prohibition flag is set until the print ends, the picture taking operation can be prevented from being performed during printing. Therefore, a print operation with the large power dissipation and the picture taking operation are not simultaneously performed, the peak value of the power dissipation can be suppressed, and it is possible to contribute to lengthen the usable period of the battery.

In addition, exceeding the power peak value of the battery during printing can be prevented, since the print operation and the picture taking operation are not performed simultaneously. As a result, it is possible to prevent an irregular print and the interruption of the print from occurring. Since the interruption of the print does not occur, a photosensitive form is not wasted. Therefore, it is extremely valid in the print method to obtain the positive image directly by the diffusion transfer method according to the embodiment.

Since a basic configuration of an electronic camera in this embodiment is similar to FIG. 1, separate drawings will be omitted.

Figure 6:
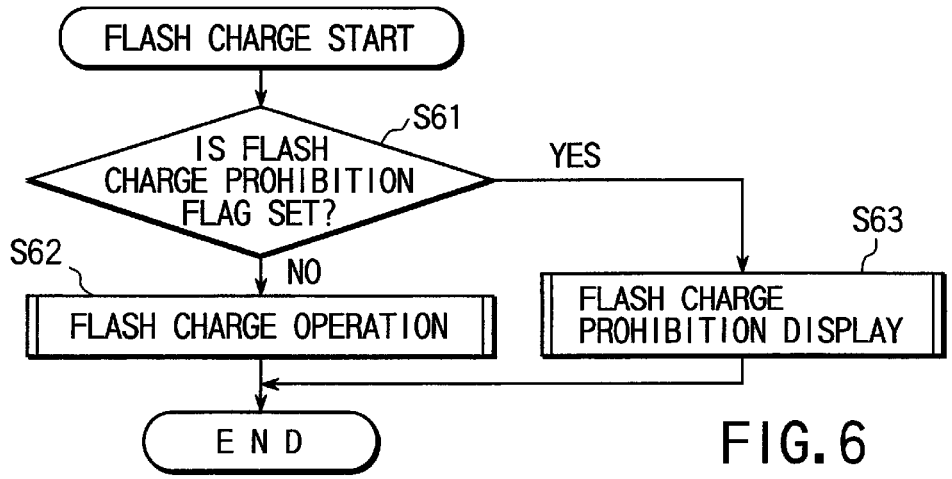
FIG. 6 is a flow chart which shows picture taking mode processing in the second embodiment.

It is judged whether the flash charge prohibition flag is set, first, when the start of the picture taking is directed by the user as shown in the flow chart of FIG. 6 (step S61). Then, if the flash charge prohibition flag is not set, the picture taking operation is performed (step S62). However, if the flash charge prohibition flag is set, the picture taking prohibition is displayed, and the taking picture operation cannot be performed (step S63).

Figure 5:
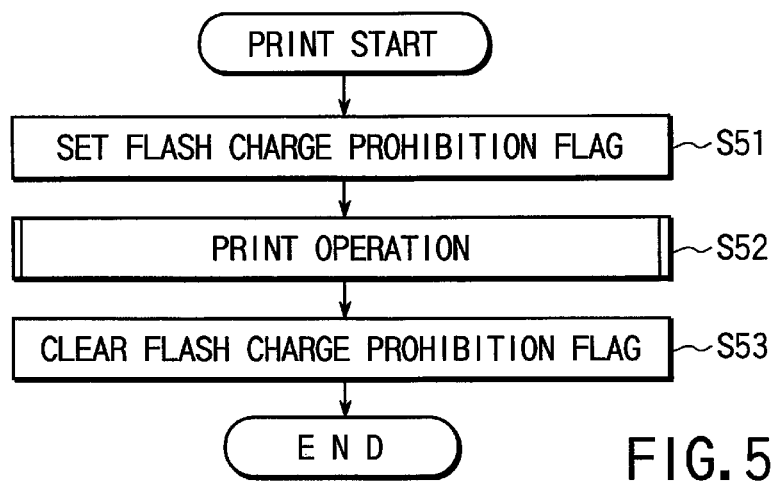
FIG. 5 is a flow chart which shows print mode processing in the second embodiment.

As shown in FIG. 5, since the flash charge prohibition flag is set during printing, even if the flash charge is directed during printing, the flash charge operation cannot be performed. That is, the flash charge operation can be prevented from being performed during printing.

As described above, according to the embodiment, since the flash charge prohibition flag is set at the start of print, and the flash charge prohibition flag is set until the print ends, the flash charge operation can be prevented from being performed during printing. Therefore, as well as the first embodiment, the peak value of the power dissipation can be suppressed, it is possible to contribute to lengthen the usable period of the battery, and it is possible to prevent an irregular print and the print interruption from occurring.

Since a basic configuration of an electronic camera in this embodiment is similar to FIG. 1, separate drawings are omitted.

Figure 7:
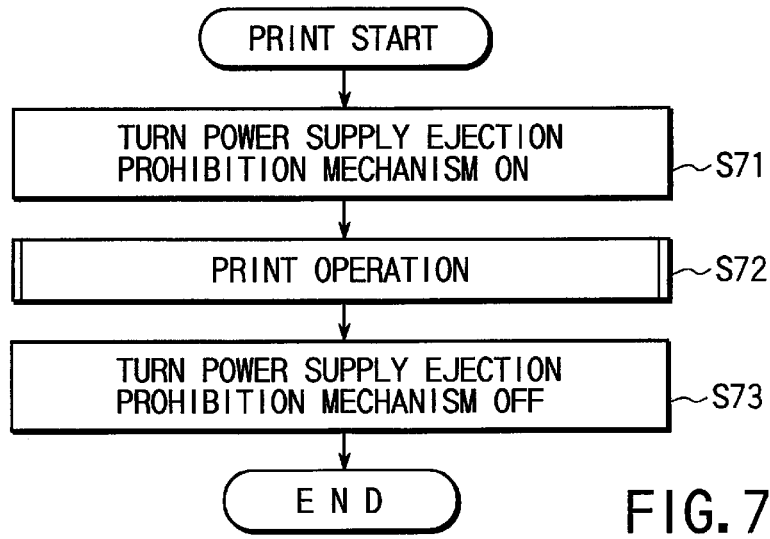
FIG. 7 is a flow chart which shows print mode processing in the third embodiment.

In this embodiment, the power supply ejection prohibition mechanism (described later) is turned on, when the start of print is directed by the user, as shown in the flow chart of FIG. 7 (step S71). Thereafter, the print operation is performed (step S72). Then, when the print operation ends, the power supply ejection prohibition mechanism is turned off (step S73). Therefore, the power supply (battery) cannot be removed from the main body of the camera, and the print can be prevented from being interrupted were the battery to be removed during printing.

Figure 8:
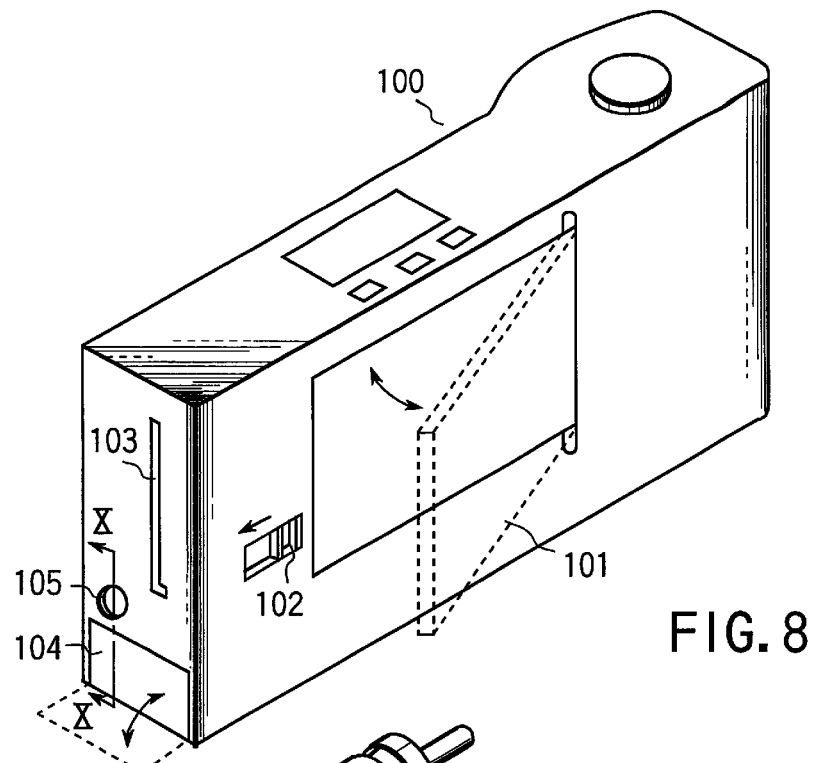
FIG. 8 is a perspective view which shows a configuration of an electronic camera having a power supply ejection prohibition mechanism.

Next, the example of a specific configuration of the power supply ejection prohibition mechanism will be explained referring to FIG. 8 to FIG. 10. FIG. 8 is a perspective view which shows a whole configuration of an electronic camera, FIG. 9 is an exploded perspective view of the power supply ejection prohibition mechanism, and FIG. 10 is sectional view of FIG. 8 alone line X—X.

As shown in FIG. 8, cartridge exchange cover 101 which is provided in free opening and shutting, and in addition, cartridge exchange knob 102 is provided 10 slidably on the rear surface of main body 100 of the camera. Form outlet 103, battery cover 104, and DC jack 105 are provided on the side of main body 100 of the camera, respectively.

Figure 9:
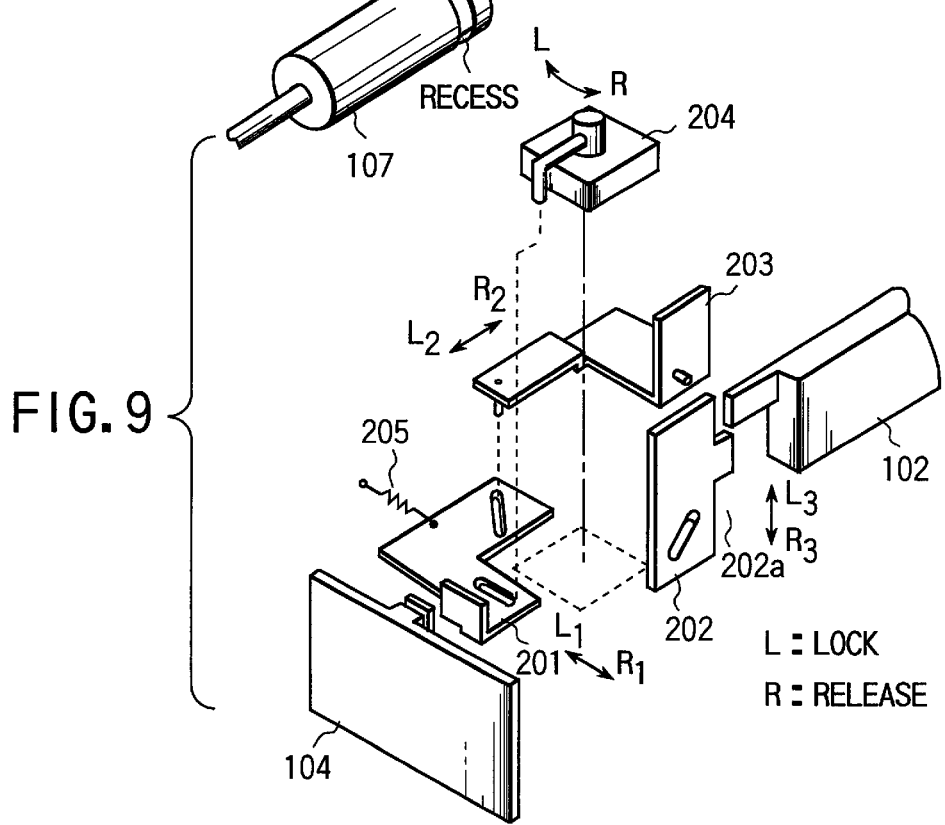
FIG. 9 is an exploded perspective view which shows a power supply ejection prohibition mechanism.

The power supply ejection prohibition mechanism 15 consists of the first lock plate 201 which moves back and forth, the second lock plate 202 which moves up and down, interconnection plate 203 which moves to the right and left, rotary solenoid 204 of the own hold type, and urge spring 205, etc., as shown in FIG. 9.

Figure 10:
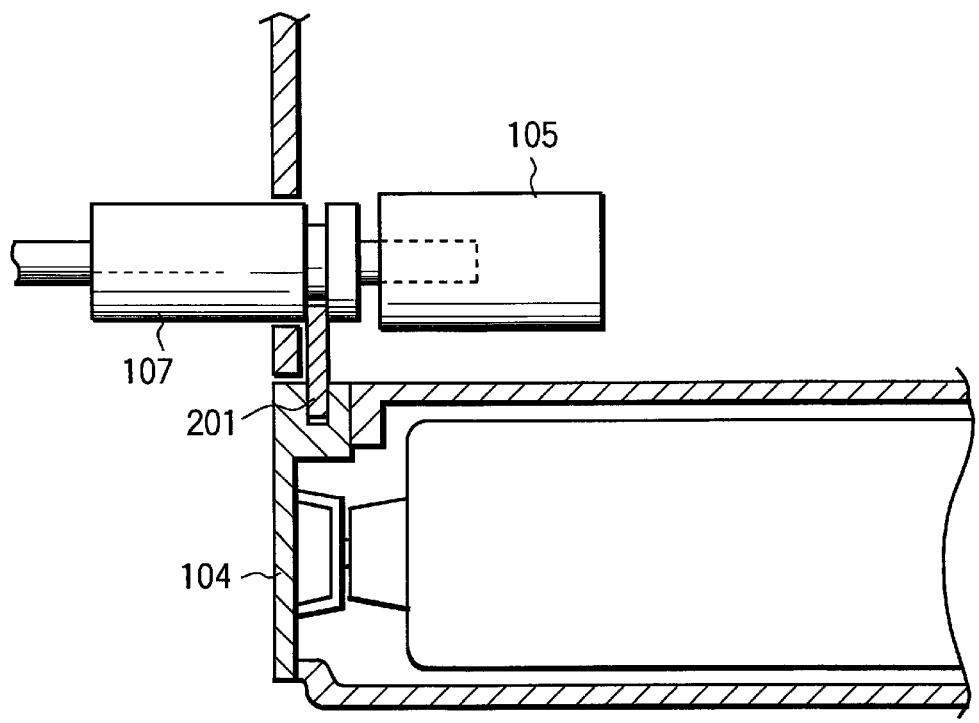
FIG. 10 is a sectional view along line X—X of FIG. 8.

When rotary solenoid 204 is set in the direction of L (lock), the first lock plate is moved in the direction of L1 of the FIG. 9 inside, and a part of lock plate 201 falls into the trench of battery cover 104 and DC plug 107, as shown in FIG. 10. As a result, the opening of battery cover 104 and removal of DC plug 107 are interrupted. Then, interconnection plate 203 moves in the direction of L2 of the FIG. 9 by moving the first lock plate 201, and the second lock plate 202 moves in the direction of L3 of the FIG. 9, thereby knob lock part 202a of lock plate 202 is set at the position opposite to cartridge exchange knob 102. As a result, the movement of cartridge exchange knob 102 is interrupted, and cartridge exchange cover 101 is prevented from being opened and shut.

Figure 11:
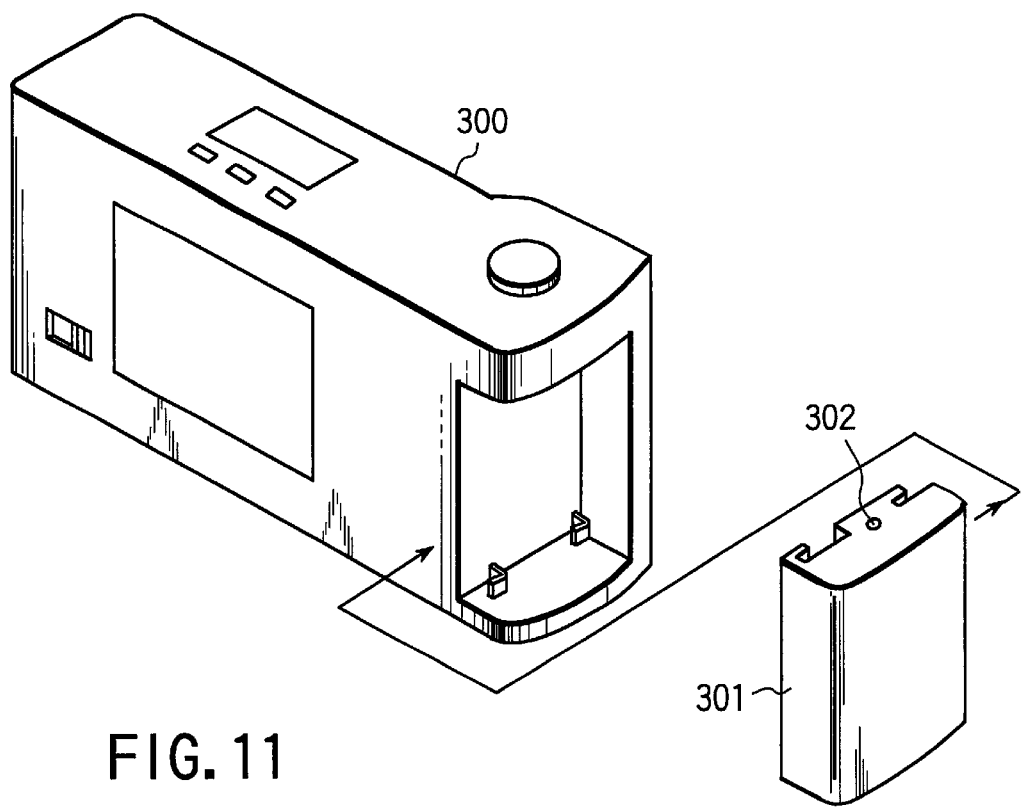
FIG. 11 is a perspective view which shows another example of power supply ejection prohibition mechanism.

FIG. 11 is a figure which shows another example of power supply ejection prohibition mechanism. First, lock pin insertion recess 302 is provided on one side of detachable battery 301. Then, if the lock pin (not shown in the figure) provided in main body 300 of the camera is inserted to recess 302 in a state that battery 301 is provided in main body 300 of the camera, the removal of battery 301 is interrupted. That is, the power supply ejection prohibition mechanism can be engaged and disengaged by moving the lock pin.

The present invention is not limited to each embodiment mentioned above. In each above-mentioned embodiment, though one of taking a picture by the electronic imaging means, the charge to the flash capacitor, and the removal of the power supply or the power supply plug is prohibited when the print is performed by the print means, all of them may be prohibited. In this case, the decrease of the power dissipation peak value becomes more certain. Control may be performed by properly selecting a plurality of means among above-mentioned means. In this case, performing a minimum function during printing becomes possible with suppressing the power peak value, and convenience on the user side improves.

The configuration of the print mechanism is not limited to a so-called instant camera method to obtain the positive image directly by using the diffusion transfer method. The printer of the thermal transfer type, the ink-jet type, and the sublime type may be used.

The configuration of the main body of the camera is not limited to FIG. 1, but a camera which images the subject image by the imaging element such as CCD, generates an electrical image information, and memorizes this image information to the flash memory etc. may be adaptable. In the method which displays the image in the lump at the same time as taking a picture and prints it out to printing paper, it is also possible to omit the memory means such as the flash memory.

The present invention can be carried out by transforming within the range of scope of the invention.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An electronic camera comprising:
   an electronic imaging section which performs photoelectric conversion of a subject image and generates an electrical image information;
   a printer to print an image of the image information obtained by said electronic imaging section on a printing sheet;
   a lock section to prohibit removal of a power supply or a power supply plug which is provided detachably to a main body of said electronic camera; and
   a controller to control an operation of said lock section, wherein when a print operation by said printer is performed, said controller operates said lock section.

2. The electronic camera according to claim 1, wherein said printer has an optical head section to emit a luminescence and expose a photosensitive printing sheet based on the image information obtained by said electronic imaging section, and a driving section to move said photosensitive printing sheet.

3. The electronic camera according to claim 1, wherein said lock section couples a part of a lock plate with a part of a battery cover and prevents said battery cover from being opened and shut.

4. The electronic camera according to claim 1, wherein said lock section inserts a projection into a recess provided in a DC plug inserted into a body of the electronic camera and prevents said DC plug from being removed from the body of the electronic camera.

5. An electronic camera which is driven by a battery comprising:
   an imaging section which converts a subject image into image data;
   a print section which prints the converted image data on a predetermined print sheet;
   a sequence controller which prohibits an operation of at least one of said imaging section and a flash charge section, when said print section is operated;
   an external power supply connection terminal which connects an external power supply output with said electronic camera; and
   a lock mechanism locking to maintain a connection of a storage cover of a battery incorporated into said electronic camera and said external power supply terminal, wherein when said print section is operated, said sequence controller operates said lock mechanism.

6. The electronic camera according to claim 5, wherein said lock mechanism couples a part of a lock plate with a part of the storage cover and prevents the storage cover from being opened and shut.

7. The electronic camera according to claim 5, wherein said lock mechanism inserts a projection in a recess provided in a DC plug which is inserted into a body of the electronic camera and prevents said DC plug from being removed from the electronic camera.

8. The electronic camera according to claim 5, wherein said print section includes a print mechanism which uses a photosensitive sheet and performs a chemical treatment.

9. The electronic camera according to claim 5, wherein said print section includes a print mechanism which outputs a positive image.

* * * * *